United States Patent Office 3,399,055
Patented Aug. 27, 1968

3,399,055
SEPARATION OF COBALT BY LIQUID EXTRACTION FROM ACID SOLUTIONS
Gordon M. Ritcey, Bells Corners, Ontario, and Allan W. Ashbrook, Ottawa, Ontario, Canada, assignors to Eldorado Mining and Refining Limited, Ottawa, Ontario, Canada, a company of Canada
No Drawing. Filed June 21, 1965, Ser. No. 465,789
16 Claims. (Cl. 75—119)

ABSTRACT OF THE DISCLOSURE

A process for the separation of cobalt and nickel from an acid leach solution containing cobalt and nickel, which comprises contacting said solution with a salt of an organophosphoric acid haivng the formula

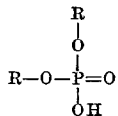

wherein R is selected from the group consisting of hydrogen, alkyl, aryl and aralkyl and wherein not more than one R is hydrogen, each R group other than hydrogen containing at least 8 carbon atoms and the phosphoric acid molecule containing at least 12 carbon atoms, said salt being dissolved in an inert organic solvent, and said separation being conducted at a pH of about 5.0 to about 6.5, whereby the cobalt values are extracted from the aqueous phase to the organic phase from the remaining aqueous phase. Subsequently the organic phase is scrubbed to remove nickel, and cobalt valves are then stripped from the organic phase.

---

This innvention relates to the separation of cobalt from nickel in an acid solution in which they are dissolved and more particularly to a process in which an alkali metal or ammonium salt of an organo phosphoric acid compound is used as solvent in the liquid-liquid separation of cobalt and nickel from acid solutions.

Processes are known for separating cobalt and nickel from acid solution, in which ores containing cobalt and nickel are reduced in a furnace, the calcined ores are leached in an acid solution to extract the nickel and the cobalt, and finally separating the nickel and cobalt from the product liquor.

It has now been found that cobalt and nickel can be selectively extracted from acid solutions by liquid-liquid separation. According to the process of the invention an acid solution containing cobalt and nickel is subjected to liquid-liquid solvent extraction with a solvent extraction reagent comprising an alkali metal or ammonium salt of an organo phosphoric acid dissolved in an inert organic solvent. During the extraction the organic phase becomes loaded with cobalt while the nickel remains in the raffinate.

The two phases are then separated and the organic phase, containing the cobalt, is scrubbed to remove occluded nickel. After scrubbing the cobalt is stripped from the organic phase by acid treatment. The nickel is removed from the original raffinate or can be extracted after cobalt removal by any suitable technique e.g. crystallization.

The process used according to the present invention provides a very simple and economical process whereby cobalt and nickel values are recovered from nickel and cobalt bearing solutions in a highly pure state and in high yield.

The solvent extraction reagent which can be used according to this invention is advantageously an alkali metal or ammonium salt of an organo phosphoric acid compound of the following fromula

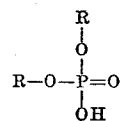

where R is selected from the group consisting of alkyl, aryl, and aralkyl radicals and wherein one R group may be hydrogen. Since the compound must be substantially water-immiscible, the total number of carbon atoms in the molecule should be sufficient to render the compound substantially insoluble. Generally at least 8 carbon atoms should be present in each R group with at least 12 carbon atoms in the phosphoric acid molecule. R, of course, can be substituted with a variety of groups such as alkoxy, halogens, etc., and R can be saturated or unsaturated or interrupted by hetero atoms so long as there is no interference in the performance of the compound in extracting cobalt ions from the aqueous phase to the organic phase. It is only necessary that the organic phosphate, in addition to its extracting function, be soluble in organic solvents and have sufficient carbon atoms to render the compound insoluble in water.

Particular compounds which can be advantageously used according to this invention are the alkali metal or ammonium salts of di-(2-ethylhexyl) phosphoric acid, heptadecylphosphoric acid, dodecyl-phosphoric acid, di-(1-methylheptyl) phosphoric acid diisooctyl-phosphoric acid, di-(2-ethyl-4-methyl pentyl) phosphoric acid, di-(2-propyl-4-methyl-pentyl) phosphoric acid, octylphenyl phosphoric acid, the isooctyl or stearyl derivatives of alkyl acid phosphates, and the like. A particularly suitable salt has been found to be the ammonium salt of di-(2-ethylhexyl) phosphoric acid. Generally about 5 to 40 v/o (percent by volume) of the salt is used.

The extraction will normally take place between pH 5.0 and 6.5 which is controlled by the buffering action occurring when the metal or ammonium ions are released from the solvent into the aqueous phase during the extraction of cobalt. Because of this buffering action the feed pH can be as low as 2.

A wide variety of organic solvents, in which the extraction reagent is dissolved, can be employed according to this invention. The minimum requirements for the solvent, however, are that it be substantially water-immiscible, that it will dissolve the extraction reagent, and that it will not interfere with the function of the reagent in extracting the cobalt values from aqueous cobalt and nickel bearing solutions. For extraction at elevated temperatures diluents with high flash points are used. These solvents can be aliphatic or aromatic hydrocarbons, halogenated hydrocarbons, petroleum derivatives, ethers, etc. and mixtures thereof. Examples of these various solvents include toluene, carbon tetrachloride, benzene, chloroform, methylene chloride, 2-ethyl-hexanol, and particularly a kerosene or naphtha.

It has also been found to be desirable to incorporate an additive in the solvent mixture to inhibit emulsions and assist in phase separation. About 3–5% tri-butyl phosphate or isodecanol has been found to be particularly suitable for this purpose.

Contacting the cobalt and nickel bearing aqueous solution with the solvent extraction reagent may be carried out by any of the well-known procedures employed in solvent-solvent extractions. Although continuous countercurrent methods are preferred, batch, continuous batch, and batch countercurrent methods are also useful. Any suitable liquid-liquid contacting means may be employed such as a pulse column, a countercurrent rotating disc column, and the like. The temperature at which the mixing is carried out is not critical but advantageously the temperature is maintained at about 20° C. to 70° C. depending on the boiling point of the diluent used. Experiments have shown better separation at higher temperatures (see Table D).

The ratio of the volume of the organic phase to the aqueous phase can be varied considerably and the most efficient ratio in each case can be readily determined by one skilled in the art. The particular ratio selected for any given extraction may depend upon the extraction reagent, diluent, and type of cobalt and nickel bearing solution employed as well as their concentration and the method of mixing them, etc. Countercurrent methods are usually desirable when the ratio of the organic phase to the aqueous phase is relatively low. In tests conducted in a pulse column an aqueous/organic ratio of 1/1 was found to be very satisfactory. In general the ratio is adjusted to permit substantially complete loading of all of the cobalt into the organic, with minimum losses of cobalt to the raffinate.

After the cobalt values have been transferred to the organic phase and the aqueous and organic phases separated, the organic phase is transferred to a scrubber of known design. In the scrubber the cobalt containing organic phase is advantageously scrubbed with a solution containing 10–100 grams cobalt per litre as sulfate or nitrate at pH 4.5–5.5. It is also possible to remove the nickel by scrubbing with a dilute mineral acid solution (e.g. 0.6 N $H_2SO_4$ or $HNO_3$) which also removes some cobalt. This cobalt loss can be recovered by recycling to an extraction stage.

After the scrubbing, the cobalt containing organic phase is transferred from the scrubber to a stripping circuit, which can be any suitable liquid-liquid contactor. In the stripping circuit the cobalt containing organic phase is advantageously contacted with 2–30 v/o of a mineral acid, e.g. sulfuric, nitric or hydrochloric acid (or about 0.5–5 N mineral acid), the choice of acid depending on the cobalt salt required.

The cobalt and nickel containing acid solution normally contains about 0.1–50 g./l. of cobalt and about 0.1–50 g./l. of nickel, while the loaded organic phase obtained usually contains about 5–25 g./l. of cobalt and less than 0.1 g./l. nickel. After scrubbing the organic phase contains about 5–25 g./l. cobalt and less than 0.01 g./l. nickel.

The acid solution is prepared by leaching the ore containing the metals with an acid. Nitric or sulfuric acid has been found to be the most suitable for the leaching step. It is desirable to minimize the impurity content of the acid solution before extraction and this can be accomplished by various methods. Thus elements such as iron, copper, arsenic, etc. can be removed from the leach slurry by such techniques as pH adjustment, precipitation and filtration.

It is particularly important to remove copper since any copper in the solution will extract preferentially to cobalt. It has been found that by raising the pH of the solution to 5.3 nearly all of the copper precipitates out so that less than 0.01% copper remains in solution.

The process of this invention was used to recover cobalt and nickel from ores obtained in the cobalt region of Ontario. A typical ore had the following analysis:

Table A

| Element: | Percent |
|---|---|
| Ag | 0.06 |
| Al | 0.4 |
| As | 54.4 |
| Bi | 0.22 |
| Ca | 3.4 |
| Co | 10.6 |
| Cu | 0.11 |
| Fe | 7.10 |
| Mg | 0.7 |
| Ni | 5.36 |
| Si | 1.3 |
| S | 0.6 |

The invention is further illustrated by reference to the following non-limitative examples.

EXAMPLE 1

(a) A leach solution was prepared by acid leaching of an ore of the type described in Table A above. After removal of copper, iron and arsenic the concentration of the metals in solution is wholly dependent upon the solids to liquid ratio in the leach and the method of removal of the copper, iron and arsenic from the leach solution. In the following tests four feed solutions of the following compositions were used:

| | Cobalt, g./l. | Nickel, g./l. | Iron, g./l. | Arsenic, g./l. |
|---|---|---|---|---|
| Feed No. 1 | 12.2 | 14.0 | 0.058 | 2.8 |
| Feed No. 2 | 11.7 | 13.4 | 0.010 | 1.1 |
| Feed No. 3 | 12.1 | 14.1 | 0.044 | 1.1 |
| Feed No. 4 | 11.7 | 13.3 | 0.017 | 0.4 |

(b) An extraction solvent was also prepared by adding di-(2-ethylhexyl) phosphoric acid to Shell 140 F.N. naphtha containing 5 v/o tributyl phosphate. The solvent was then contacted with $Na_2CO_3$ solution to form the sodium salt of the acid in the solvent.

(c) A series of extractions were then conducted using several leach solutions and extraction solvents as the aqueous and organic phases, respectively. In these tests the variable was the amount of sodium salt of di-(2-ethylhexyl) phosphoric acid in the organic feed. The extractions were conducted at pH 5–6 and aqueous to organic ratio of 1:1 and the results are tabulated in Table B below:

TABLE B

| Solvent, percent by vol. of the sodium salt of di (2-ethylhexyl) phosphoric acid | Feed No. | Extract (g./l.) | | Raffinate (g./l.) | | Equilibrium, pH |
|---|---|---|---|---|---|---|
| | | Co | Ni | Co | Ni | |
| 15 | 1 | 10.1 | 3.5 | 9.5 | 13.0 | 5.5 |
| 20 | | 12.9 | 5.5 | 8.5 | 12.3 | 5.5 |
| 30 | | 19.5 | 6.4 | 6.2 | 11.6 | 5.6 |
| 40 | | 24.0 | 9.2 | 4.4 | 9.7 | 5.7 |
| 15 | 2 | 10.4 | 3.5 | 9.2 | 13.0 | 5.0 |
| 20 | | 13.0 | 5.7 | 8.0 | 12.3 | 5.2 |
| 30 | | 19.0 | 6.5 | 5.8 | 11.3 | 5.5 |
| 40 | | 23.5 | 8.9 | 4.1 | 9.5 | 5.7 |
| 15 | 3 | 11.4 | 3.3 | 10.2 | 13.8 | 5.4 |
| 20 | | 12.1 | 5.1 | 8.8 | 12.8 | 5.4 |
| 30 | | 16.5 | 5.6 | 7.0 | 7.4 | 5.4 |
| 40 | | 21.0 | 8.4 | 5.2 | 10.8 | 5.5 |
| 15 | 4 | 10.1 | 3.9 | 8.4 | 12.1 | 5.6 |
| 20 | | 12.6 | 5.4 | 7.6 | 11.6 | 5.6 |
| 30 | | 18.5 | 6.3 | 5.5 | 10.9 | 5.6 |
| 40 | | 22.0 | 8.8 | 3.6 | 8.8 | 5.7 |

EXAMPLE 2

A series of tests were also conducted to determine the maximum cobalt and nickel loading of various extraction solvents. These solvents were prepared in a manner similar to that described in Example 1(b) and consisted of Shell 140 F.N. naphtha containing 5 v/o isodecanol and varying amounts of the sodium salt of di-(2-ethylhexyl) phosphoric acid.

These solvents were contacted with both sulfuric acid and nitric acid leach solutions containing cobalt and nickel respectively. Results, as tabulated in Table E below, showed that even after three scrubs, the extract contained about 1.5 g./l. Ni. In a second series of tests, the solvent containing 5 v/o tributyl phosphate with 12.9

TABLE E

| Scrub Solution | Number of Contacts | Emulsion Supp. | Extract, g./l. | | Raffinate, g./l. | |
|---|---|---|---|---|---|---|
| | | | Co | Ni | Co | Ni |
| Co(NO₃)₂ (20 g. Co/l.) | 1 | Isodecanol | 20.8 | 2.0 | 20.1 | 0.80 |
| | 1 | Isodecanol | | | 20.6 | 0.80 |
| | 2 | ----do---- | 21.6 | 1.5 | 20.8 | 0.20 |
| | 1 | Isodecanol | | | 20.2 | 0.80 |
| | 2 | ----do---- | | | 21.4 | 0.20 |
| | 3 | ----do---- | 22.4 | 1.4 | 21.2 | 0.10 |
| CoSO₄ (27 g. Co/l.) | 1 | Tributyl phosphate | 16.0 | 0.1 | 26.0 | 0.8 |
| | 1 | Tributyl phosphate | | | | |
| | 2 | ----do---- | 16.1 | 0.04 | 27.0 | 0.2 |
| | 1 | Tributyl phosphate | | | | |
| | 2 | ----do---- | | | 26.8 | 0.2 |
| | 3 | ----do---- | | 0.03 | 26.3 | 0.2 |
| Co(NO₃)₂ (26 g. Co/l.) | 1 | Tributyl phosphate | 16.2 | 0.2 | 26.3 | 0.8 |
| | 1 | Tributyl phosphate | | | 26.1 | 0.8 |
| | 2 | ----do---- | 16.3 | 0.1 | 25.9 | 0.2 |
| | 1 | Tributyl phosphate | | | 25.2 | 0.8 |
| | 2 | ----do---- | | | 26.0 | 0.2 |
| | 3 | ----do---- | 16.2 | 0.08 | 25.5 | 0.2 | nickel at pH 6 and 1:1 aqueous to organic ratio. The results of these tests are tabulated in Table C below:

TABLE C

| System | Sodium salt of di-(2-ethylhexyl) phosphoric acid, v/o | Max. loading, g./l. | |
|---|---|---|---|
| | | Co | Ni |
| Sulphate | 15 | 15 | 10 |
| | 20 | 21 | 14 |
| | 30 | 28 | 23 |
| | 40 | 32 | 26 |
| Nitrate | 15 | 15 | 10 |
| | 20 | 21 | 14 |
| | 30 | 28 | |
| | 40 | 33 | 25 |

EXAMPLE 3

In order to study the effect of temperature on the extractions of cobalt and nickel, a series of extractions were conducted at temperatures between 32 and 59° C.

An acid leach solution was obtained from the leaching of an ore of the type described in Table A above and iron and arsenic were removed from the solution.

An extraction solvent was also prepared consisting of a naphtha solvent containing 15 v/o of the sodium salt of di-(2-ethylhexyl) phosphoric acid and 5 v/o isodecanol.

The leach solution and extraction solvent were then contacted by shake-outs in Erlenmeyer flasks, placed in a thermostatically controlled water bath and mixed by means of a mechanical (wrist-action) shaker. The aqueous to organic ratio was 2:1 and the contact time 10 minutes. Results as tabulated in Table D below indicate that increasing temperature results in increased cobalt loading, with a decrease in the amount of nickel extracted.

TABLE D

| Temp., °C. | Extract, g./l. | | Equil. pH |
|---|---|---|---|
| | Co | Ni | |
| 32 | 6.8 | 1.1 | 5.4 |
| | 6.7 | 1.3 | 5.4 |
| 42 | 7.6 | 0.4 | 5.4 |
| | 7.7 | 0.5 | 5.4 |
| 50 | 8.0 | 0.2 | 5.5 |
| | 8.1 | 0.3 | 5.5 |
| 59 | 10.3 | 0.2 | 5.5 |

EXAMPLE 4

Scrubbing tests were conducted on a 15 v/o di-(2-ethylhexyl) phosphoric acid sodium salt-naphtha solvent containing cobalt and nickel. The scrub solutions used were cobalt nitrate and cobalt sulfate, each containing about 20 g. Co/l. In the first series of tests, the solvent contained 5 v/o isodecanol, with 8.4 and 4.5 g./l. of cobalt and nickel respectively. Scrubbing tests on this extract showed that nickel could be reduced to <0.05 g./l. The cobalt sulfate solution appeared to be more effective than the nitrate solution. In all tests, the aqueous to organic ratio was 5/1 and the contact time was 10 minutes at room temperature.

EXAMPLE 5

Tests were carried out to determine whether large amounts of nickel can be successfully removed from solvent, containing both cobalt and nickel, by scrubbing with an aqueous cobalt sulfate solution. A solvent solution containing 9.5 and 3.2 g./l. of nickel and cobalt respectively was contacted with an aqueous cobalt sulfate solution containing 28.6 g./l. Co at an aqueous/organic ratio of 1/1 for 5 minutes. The percent nickel removed at 20, 40, 60 and 70° C. was 45, 65, 75 and 80% respectively.

Increasing the cobalt concentration in the scrub solution increased the amount of nickel removed per contact.

The effect of the aqueous to organic ratio was also investigated. Results showed that at an aqueous/organic ratio of 1/1, greater than 95% of the nickel was removed after 3 contacts, while at 1/5 and 1/10 ratios, 67 and 32% of the nickel was removed after 3 contacts. At elevated temperatures isodecanol was found to have no deleterious effect (see Table E) on the removal of nickel from the loaded extract by scrubbing.

EXAMPLE 6

Stripping tests were carried out on a 20 v/o di-(2-ethylhexyl) phosphoric acid sodium salt/5 v/o isodecanol/naphtha extract containing 8.4 and 4.5 g./l. cobalt and nickel respectively. The strip solutions used were 1, 5 and 10 v/o sulfuric and nitric acids, and 5 v/o hydrochloric acid. In each case the aqueous to organic ratio was 1:1 and the contact time 10 minutes. Results, given in Table F, show that both cobalt and nickel are readily stripped from the organic phase using these acids.

TABLE F

| Strip Sol'n Acid | v/o | Strip No. | Strip, g./l. | | Stripped Extract, g./l. | |
|---|---|---|---|---|---|---|
| | | | Co | Ni | Co | Ni |
| HNO₃ | 1 | 1 | 2.0 | 2.2 | | |
| | | 2 | 2.9 | 1.5 | | |
| | | 3 | 3.0 | 0.5 | <0.02 | <0.01 |
| | 5 | 1 | 8.5 | 4.2 | | |
| | | 2 | 0.2 | 0.08 | <0.02 | <0.01 |
| | 10 | 1 | 8.2 | 4.0 | | |
| | | 2 | 0.1 | 0.05 | <0.02 | <0.01 |
| H₂SO₄ | 1 | 1 | 4.9 | 3.3 | | |
| | | 2 | 3.2 | 0.7 | | |
| | | 3 | 0.09 | 0.02 | <0.02 | <0.01 |
| HCl | 5 | 1 | 8.9 | 4.8 | | |
| | | 2 | 0.36 | 0.2 | <0.02 | <0.01 |

EXAMPLE 7

(a) Extraction

Continuous solvent extraction tests were conducted on nitric acid leach liquor obtained by leaching ore of the type described in Table A with nitric acid.

The extractions were carried out in a 40 foot tall pulse column using a solvent mixture of 30 v/o di-(2-ethylhexyl) phosphoric acid, 5 v/o tributyl phosphate and 65% Shell 140 F.N. naphtha. The leach liquor was first treated to remove the bulk of the arsenic contained in it by addition of ferric iron as ferric sulfate and precipitation of the ferric arsenite at pH 2.5. The solvent was ammonia-equilibrated with 6 v/o ammonium hydroxide solution which dissolved in the organic phase. The extraction was carried out at 60° C.±3° C.

The maximum organic loading obtained was 21.5 g./l. Co and 0.48 g./l. Ni. The maximum recovery of cobalt was 97.8%. The loaded organic was readily stripped with 1.6 N $HNO_3$.

The aqueous phase flow rate through the column was 2.65 Imp. gal./hr.

Details of the solvent extraction test are shown in Table G.

TABLE G

| Aqueous/Organic Ratio Nominal | Product | Organic, g./l. | | | | Aqueous, g./l. | | | | pH |
|---|---|---|---|---|---|---|---|---|---|---|
| | | Co | Ni | As | Fe | Co | Ni | As | Fe | |
| 1:1 | Aqueous Feed | | | | | 21.6 | 14.3 | 0.46 | <0.01 | 3.5 |
| | Loaded Organic | 21.5 | 0.48 | <0.1 | <0.1 | | | | | 5.3 |
| | Raffinate | | | | | 0.50 | 12.2 | 0.5 | <0.01 | |

(b) Scrubbing (1) Cobalt solution scrubbing.—The composite of organic loaded with 21.5 g./l. cobalt and 0.48 g./l. nickel from (a) was scrubbed in a 20 foot high pulse column with cobalt solution containing approximately 40 g./l. Co as cobalt sulfate at pH 4.5. The nickel level in the organic was reduced to less than 0.02 g./l. Ni.

(2) Dilute acid scrubbing.—The loaded organic from (a) was contacted with 0.6 N nitric or sulfuric acid and at an aqueous to organic ratio of 1:4 (and also at a ratio of 2:15 for the sulfuric acid). Such scrubbing with mineral acid would enable the scrubbed raffinate to be recycled as feed to the extraction stage. Some test results are given in Table H.

TABLE H

| Acid | Aqueous:Organic Ratio | Raffinate, g./l. | | Extract, g./l. | |
|---|---|---|---|---|---|
| | | Co | Ni | Co | Ni |
| 0.6 N $HNO_3$ | 1:4 | 25.0 | 1.74 | 12.9 | 0.063 |
| 0.6 N $H_2SO_4$ | 1:4 | 27.3 | 1.69 | 14.4 | <0.010 |
| 0.6 N $H_2SO_4$ | 2:15 | 26.8 | 2.22 | 18.4 | <0.05 |

(c) Stripping

The scrubbed organic obtained in part (b) above was stripped in an acid strip column with 10% $HNO_3$ at 45° C. and the resultant strip solution was boiled down to recover cobalt nitrate.

We claim:

1. A process for separation of cobalt and nickel from an acid leach solution containing cobalt and nickel, which comprises contacting said solution with a salt of an organophosphoric acid having the formula

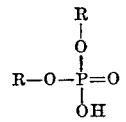

wherein R is selected from the group consisting of hydrogen, alkyl, aryl and aralkyl and wherein not more than one R is hydrogen, each R group other than hydrogen containing at least 8 carbon atoms and the phosphoric acid molecule containing at least 12 carbon atoms, said salt being dissolved in an inert organic solvent, said separation being conducted at a pH of about 5.0 to about 6.5 separating the resultant cobalt loaded organic phase whereby the cobalt values are extracted from the aqueous phase to the organic phase from the remaining aqueous phase, and scrubbing the cobalt phase to remove occluded nickel.

2. The process of claim 1 in which the salt is a member selected from the group consisting of alkali metal salts and ammonium salts of said acid.

3. The process of claim 2 in which the salt is the ammonium salt of di-(2-ethylhexyl) phosphoric acid.

4. The process of claim 1 in which the organic solvent contains an emulsion inhibitor.

5. The process of claim 1 in which the organic solvent is naphtha.

6. The process of claim 1 in which the organic solvent is kerosene.

7. A process for separation of cobalt and nickel from an acid leach solution, containing said metals, which comprises contacting said solution with an extraction solvent comprising a substantially water-immiscible organic solvent containing 5 to 40% by volume of the ammonium salt of di-(2-ethylhexyl) phosphoric acid and 3–5% by volume of an emulsion inhibitor selected from tributyl phosphate and isodecanol, and said separation being conducted at a pH of about 5.0 to about 6.5 whereby the cobalt values are extracted from the aqueous phase to the organic phase, separating the resultant cobalt loaded organic phase from the remaining aqueous phase, scrubbing the cobalt loaded organic phase to remove occluded nickel and acid stripping the scrubbed organic phase with 0.5–5 N mineral acid to free the cobalt in the form of salt.

8. The process of claim 7 in which the loaded organic phase is scrubbed with 0.6 N sulfuric acid.

9. The process of claim 7 in which the loaded organic phase is scrubbed with 0.6 N nitric acid.

10. The process of claim 7 in which the loaded organic phase is scrubbed with a solution containing 10–100 g./l. of cobalt as the sulfate.

11. The process of claim 7 in which the loaded organic phase is scrubbed with a solution containing 10–100 g./l. of cobalt as the nitrate.

12. The process of claim 7 in which the treated acid leach solution contains about 0.1–50 g./l. of cobalt and about 0.1–50 g./l. of nickel.

13. The process of claim 12 in which the treated acid leach solution contains less than 0.01% of copper.

14. The process of claim 7 in which the organic solvent contains a naphtha.

15. The process of claim 7 in which the extraction takes place at a temperature of 20–70° C.

16. The process of claim 7 in which the scrubbing takes place at a pH of about 4.5–5.5 and at a temperature of 20–70° C.

References Cited

UNITED STATES PATENTS 3,193,381  7/1965  George et al. _____ 75—108

FOREIGN PATENTS 949,906  2/1964  Great Britain.
718,834  9/1965  Canada.

HYLAND BIZOT, *Primary Examiner.*